United States Patent
Hirabayashi et al.

(10) Patent No.: US 10,232,844 B2
(45) Date of Patent: Mar. 19, 2019

(54) HYBRID VEHICLE AND METHOD FOR CONTROLLING SAME

(71) Applicant: TOYOTA JIDOSHA KABUSHIKI KAISHA, Toyota-shi, Aichi-ken (JP)

(72) Inventors: Hidekazu Hirabayashi, Chiryu (JP); Kunihiko Jinno, Toyota (JP); Hiroaki Matsumoto, Nagoya (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 93 days.

(21) Appl. No.: 15/027,319

(22) PCT Filed: Oct. 1, 2014

(86) PCT No.: PCT/IB2014/001979
§ 371 (c)(1),
(2) Date: Apr. 5, 2016

(87) PCT Pub. No.: WO2015/052564
PCT Pub. Date: Apr. 16, 2015

(65) Prior Publication Data
US 2016/0244052 A1    Aug. 25, 2016

(30) Foreign Application Priority Data

Oct. 9, 2013 (JP) ................. 2013-211655

(51) Int. Cl.
*B60W 20/40* (2016.01)
*B60K 6/445* (2007.10)
(Continued)

(52) U.S. Cl.
CPC ............ *B60W 20/40* (2013.01); *B60H 1/004* (2013.01); *B60H 1/034* (2013.01); *B60H 1/04* (2013.01);
(Continued)

(58) Field of Classification Search
CPC ...................................... B60W 20/40
See application file for complete search history.

(56) References Cited

U.S. PATENT DOCUMENTS 9,315,190 B2 * 4/2016 Yu .......................... B60W 10/06
9,322,579 B2 * 4/2016 Morimoto ............... F25B 21/00
(Continued)

FOREIGN PATENT DOCUMENTS

DE   10 2012 219 761 A1   5/2013
EP       2 815 945 A1    12/2014
(Continued)

*Primary Examiner* — Hussein Elchanti
*Assistant Examiner* — Michael A Berns
(74) *Attorney, Agent, or Firm* — Finnegan, Henderson, Farabow, Garrett & Dunner, LLP

(57) ABSTRACT

A hybrid vehicle includes: an internal combustion engine; a generator that generates electric power by using an output of the internal combustion engine; an electric storage device that stores the electric power generated by the generator; an electric motor that generates a driving force for the hybrid vehicle by receiving at least one of the electric power that is generated by the generator and the electric power that is stored in the electric storage device; a heating apparatus that heats a vehicle cabin, the heating apparatus including an electric heater that heats the vehicle cabin by using the electric power that is stored in the electric storage device; and an electronic control unit. The electronic control unit is configured to (a) control traveling of the vehicle by selectively applying a CD mode and a CS mode, the CD mode being a mode in which an SOC of the electric storage device is consumed and the CS mode being a mode in which the SOC is maintained, and (b) control the electric heater so that the heating by the electric heater is more limited in the CS mode than in the CD mode.

6 Claims, 12 Drawing Sheets

(51) Int. Cl.
*B60H 1/00* (2006.01)
*B60H 1/03* (2006.01)
*B60H 1/22* (2006.01)
*B60W 20/15* (2016.01)
*B60H 1/04* (2006.01)
*B60K 6/442* (2007.10)
*B60W 10/26* (2006.01)
*B60W 10/30* (2006.01)
*B60W 20/10* (2016.01)
*B60K 6/22* (2007.10)
*B60W 10/06* (2006.01)
*B60W 10/08* (2006.01)
*B60W 20/00* (2016.01)

(52) U.S. Cl.
CPC .......... *B60H 1/2218* (2013.01); *B60K 6/442* (2013.01); *B60K 6/445* (2013.01); *B60W 10/26* (2013.01); *B60W 10/30* (2013.01); *B60W 20/10* (2013.01); *B60W 20/15* (2016.01); *B60H 2001/2253* (2013.01); *B60H 2001/2265* (2013.01); *B60K 6/22* (2013.01); *B60W 10/06* (2013.01); *B60W 10/08* (2013.01); *B60W 20/00* (2013.01); *B60W 2510/244* (2013.01); *B60W 2710/0677* (2013.01); *B60W 2710/086* (2013.01); *B60W 2710/244* (2013.01); *B60W 2710/305* (2013.01); *B60Y 2200/92* (2013.01); *B60Y 2300/182* (2013.01); *Y02T 10/6239* (2013.01); *Y02T 10/6269* (2013.01); *Y02T 10/6286* (2013.01); *Y10S 903/93* (2013.01)

(56) References Cited

U.S. PATENT DOCUMENTS

| | | | |
|---|---|---|---|
| 9,631,547 B2* | 4/2017 | Porras | F01P 7/165 |
| 2010/0012295 A1 | 1/2010 | Nemesh et al. | |
| 2013/0030634 A1 | 1/2013 | Endo et al. | |
| 2013/0192271 A1* | 8/2013 | Barnhart | F25B 21/04 |
| | | | 62/3.3 |
| 2013/0298571 A1* | 11/2013 | Morimoto | B60H 1/32 |
| | | | 62/3.1 |
| 2014/0109872 A1* | 4/2014 | Porras | F01P 7/165 |
| | | | 123/435 |
| 2014/0114514 A1* | 4/2014 | Crombez | B60W 10/06 |
| | | | 701/22 |
| 2016/0370037 A1* | 12/2016 | Morimoto | B60H 1/32 |

FOREIGN PATENT DOCUMENTS

| | | |
|---|---|---|
| JP | 2011-31704 | 2/2011 |
| JP | 2011-237052 | 11/2011 |
| JP | 2013-95267 | 5/2013 |
| WO | WO 2011/125184 A1 | 10/2011 |
| WO | WO 2013/121574 A1 | 8/2013 |

* cited by examiner

FIG. 5 (GAS INJECTION (GI) HEATING OPERATION)

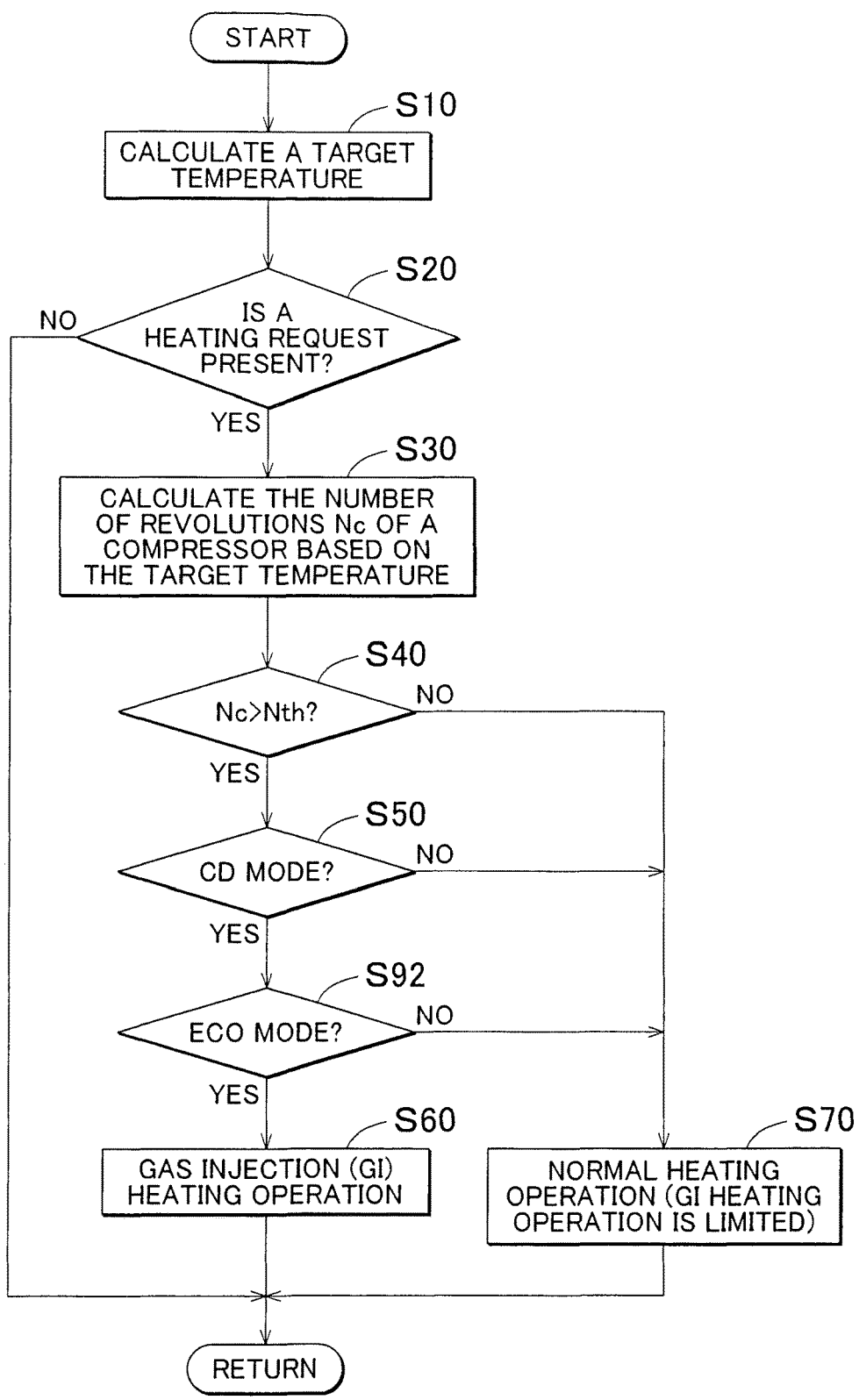

HYBRID VEHICLE AND METHOD FOR CONTROLLING SAME

CROSS-REFERENCE TO RELATED APPLICATIONS

This application is a national phase application of International Application No. PCT/I62014/001979, filed Oct. 1, 2014, and claims the priority of Japanese Application No. 2013-211655, filed Oct. 9, 2013, the content of both of which is incorporated herein by reference.

BACKGROUND OF THE INVENTION

1. Field of the Invention

The invention relates to a hybrid vehicle and a method for controlling the same and, more particularly, to a technique for controlling a heating apparatus that is loaded on a hybrid vehicle.

2. Description of Related Art

Japanese Patent Application Publication No. 2011-31704 (JP 2011-31704 A) discloses an air conditioning system for vehicles that is applied to hybrid vehicles. The hybrid vehicle includes an engine and a motor that generate a driving force for traveling, and a battery that supplies electric power to the motor. The air conditioning system has a vapor compression type refrigerant cycle, and hot water heating means. The vapor compression type refrigerant cycle has an electric compressor that compresses a refrigerant by using air conditioning electric power, and constitutes a heat pump cycle that heats blowing air which is blown into a vehicle cabin. The hot water heating means heats the blowing air by using a coolant of the engine as a heat source.

The engine is started (for HV traveling in which the engine is operated for traveling) when the remaining amount of the battery is below a margin expected level, at which a predetermined margin is expected with respect to an air conditioning difficulty level at which the supply of the air conditioning electric power is limited, during EV traveling in which the engine is stopped for motor-based traveling in the air conditioning system. In this manner, the temperature of the coolant at a time when the remaining amount of the battery is below the air conditioning difficulty level can be increased, and the heating can be continued without having to be paused even when the remaining amount of the battery declines (refer to Japanese Patent Application Publication No. 2011-31704 (JP 2011-31704 A)).

In recent years, hybrid vehicles whose batteries can be charged with electric power supply from outside the vehicles (hereinafter, referred to as "external electric power supply") have been developed (hereinafter, the charging of the battery with the external electric power supply will be referred to as "external charging"). In the hybrid vehicles of the related art, the EV traveling and the HV traveling are repeated so as to maintain a estate of charge (SOC) of the battery within a predetermined range. Meanwhile, in the hybrid vehicles that allow the external charging, a charge depleting (CD) mode in which the SOC is consumed and a charge sustaining (CS) mode in which the SOC is maintained within a predetermined range are selectively applied in traveling. The EV traveling is switched to the HV traveling even in the CD mode when large traveling power is required, and the HV traveling is switched to the EV traveling even in the CS mode when the SOC rises within a predetermined range. In other words, the EV traveling and the HV traveling are possible in both the CD mode and the CS mode.

In the CS mode, the start/stop of the engine is appropriately performed so as to maintain the SOC within a predetermined range. In contrast, the chance of engine start is smaller in the CD mode in which the SOC is consumed than in the CS mode.

SUMMARY OF THE INVENTION

The air conditioning system described in Japanese Patent Application Publication No. 2011-31704 (JP 2011-31704 A) switches the heat source of the heating according to whether the engine is started or not, that is, whether the vehicle is in the EV traveling or the HV traveling, and heating control appropriate to the CD mode/CS mode described above is not performed.

The present invention provides a hybrid vehicle that is capable of executing heating control which is appropriate to a CD mode/CS mode, and a method for controlling the same.

According to a first aspect of the present invention, a hybrid vehicle includes an internal combustion engine, a generator, an electric storage device, an electric motor, an electronic control device, and a heating apparatus that heats a vehicle cabin. The generator generates electric power by using an output of the internal combustion engine. The electric storage device stores the electric power generated by the generator. The electric motor generates a driving force for the hybrid vehicle by receiving at least one of the electric power that is generated by the generator and the electric power that is stored in the electric storage device. The electronic control device controls traveling of the vehicle by selectively applying a CD mode in which an SOC of the electric storage device is consumed and a CS mode in which the SOC is maintained. The heating apparatus includes an electric heater. The electric heater heats the vehicle cabin by using the electric power that is stored in the electric storage device. In addition, the electronic control device controls the electric heater so that the heating by the electric heater is more limited in the CS mode than in the CD mode.

In the CS mode, the start and stop of the internal combustion engine can be generated with greater frequency than in the CD mode so as to maintain the SOC of the electric storage device within a predetermined range. In this hybrid vehicle, the heating by the electric heater is more limited in the CS mode than in the CD mode, and thus a decline in the SOC in the CS mode is suppressed. In this manner, the chance of the start of the internal combustion engine in the CS mode can be suppressed. In the CD mode in which the SOC is consumed, comfort of a driver can be maintained without the internal combustion engine being started by the heating by the electric heater. As such, according to this hybrid vehicle, heating control appropriate to the CD mode/CS mode can be executed.

In the above-described aspect, the electric heater may be configured to perform a heating operation in any one of a first heating operation mode and a second heating operation mode in which electric power consumption is greater than in the first heating operation mode. The electronic control device may limit the heating operation of the electric heater in the second heating operation mode more in the CS mode than in the CD mode.

According to this hybrid vehicle, the heating operation of the electric heater in the second heating operation mode is more limited in the CS mode than in the CD mode, and thus the decline in the SOC in the CS mode can be suppressed.

In the above-described aspect, the electric heater may be configured with a heat pump cycle that includes an electric compressor, an indoor condenser, an expansion valve, and an outdoor heat exchanger. The second heating operation mode may be a gas injection mode in which a gas refrigerant downstream of the expansion valve returns to an intermediate port of the electric compressor without passing through the outdoor heat exchanger.

In the gas injection mode, the gas refrigerant downstream of the expansion valve returns to the intermediate port of the electric compressor, and thus electric power consumption by the electric compressor increases even when heating capacity increases. According to this hybrid vehicle, the heating operation in the gas injection mode in which the electric power consumption is great is limited in the CS mode, and thus the decline in the SOC in the CS mode can be suppressed.

In the above-described aspect, the heating apparatus may further include a hot water heater. The hot water heater may heat the vehicle cabin by using a coolant of the internal combustion engine with the internal combustion engine used as a heat source. The electronic control device may limit the heating by the electric heater by more preferentially using the heating by the hot water heater in the CS mode than in the CD mode.

In the CS mode, the chance of the start of the internal combustion engine is greater than in the CD mode, and thus the temperature of the coolant of the internal combustion engine is higher than in the CD mode. In this hybrid vehicle, the heating by the hot water heater is preferentially used in the CS mode, and exhaust heat of the internal combustion engine is effectively used in the heating. In this manner, the electric power consumption by the electric heater can be suppressed by limiting the heating by the electric heater in the CS mode, and the decline in the SOC in the CS mode can be suppressed.

In the above-described aspect, the electronic control device may control the electric heater, without limiting the heating by the electric heater, when the temperature of the internal combustion engine or the coolant is lower than a determination value even in the CS mode.

Even in the CS mode, the temperatures of the internal combustion engine and the coolant can decline immediately after the switching from the CD mode and in a case where the EV traveling continues for a long period of time. The heating capacity of the heating apparatus declines if the heating by the electric heater is limited in this state. According to this hybrid vehicle, the heating by the electric heater is not limited in a case where the temperatures of the internal combustion engine and the coolant are low even in the CS mode, and thus the decline in the heating capacity of the heating apparatus can be suppressed.

In the above-described aspect, the electronic control device may further be capable of controlling the traveling of the vehicle by applying an ECO mode in which the frequency of the start of the internal combustion engine is suppressed. The electronic control device may control the electric heater, without limiting the heating by the electric heater, when the CD mode is selected and the ECO mode is selected. The electronic control device may control the electric heater so that the heating by the electric heater is limited when the CD mode is selected and the ECO mode is not selected.

In this hybrid vehicle, the heating by the electric heater is not limited when the ECO mode is selected in the CD mode, and thus the start of the internal combustion engine resulting from an insufficient heating capacity can be avoided and the ECO mode can be executed even if the electric power consumption by the electric heater increases. When the ECO mode is not selected in the CD mode, the electric power consumption can be suppressed and a traveling distance in the CD mode can be ensured by limiting the heating by the electric heater.

According to a second aspect of the present invention, a control method is used in a hybrid vehicle. The hybrid vehicle includes an internal combustion engine; a generator that generates electric power by using an output of the internal combustion engine; an electric storage device that stores the electric power generated by the generator; an electric motor that generates a driving force for the hybrid vehicle by receiving at least one of the electric power that is generated by the generator and the electric power that is stored in the electric storage device; a heating apparatus that heats a vehicle cabin, the heating apparatus including an electric heater that heats the vehicle cabin by using the electric power that is stored in the electric storage device; and an electronic control unit. The control method includes: (a) controlling traveling of the vehicle by the electronic control unit by selectively applying a CD mode and a CS mode, the CD mode being a mode in which an SOC of the electric storage device is consumed and the CS mode being a mode in which the SOC is maintained; and (b) controlling the electric heater by the electronic control unit so that the heating by the electric heater is more limited in the CS mode than in the CD mode.

According to the present invention, the hybrid vehicle that is capable of executing the heating control which is appropriate to the CD mode/CS mode, and the method for controlling the same can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 12 is a flowchart illustrating a processing procedure of heating control that is executed by an ECU according to modification example 4.

DETAILED DESCRIPTION OF EMBODIMENTS

Figure 1:
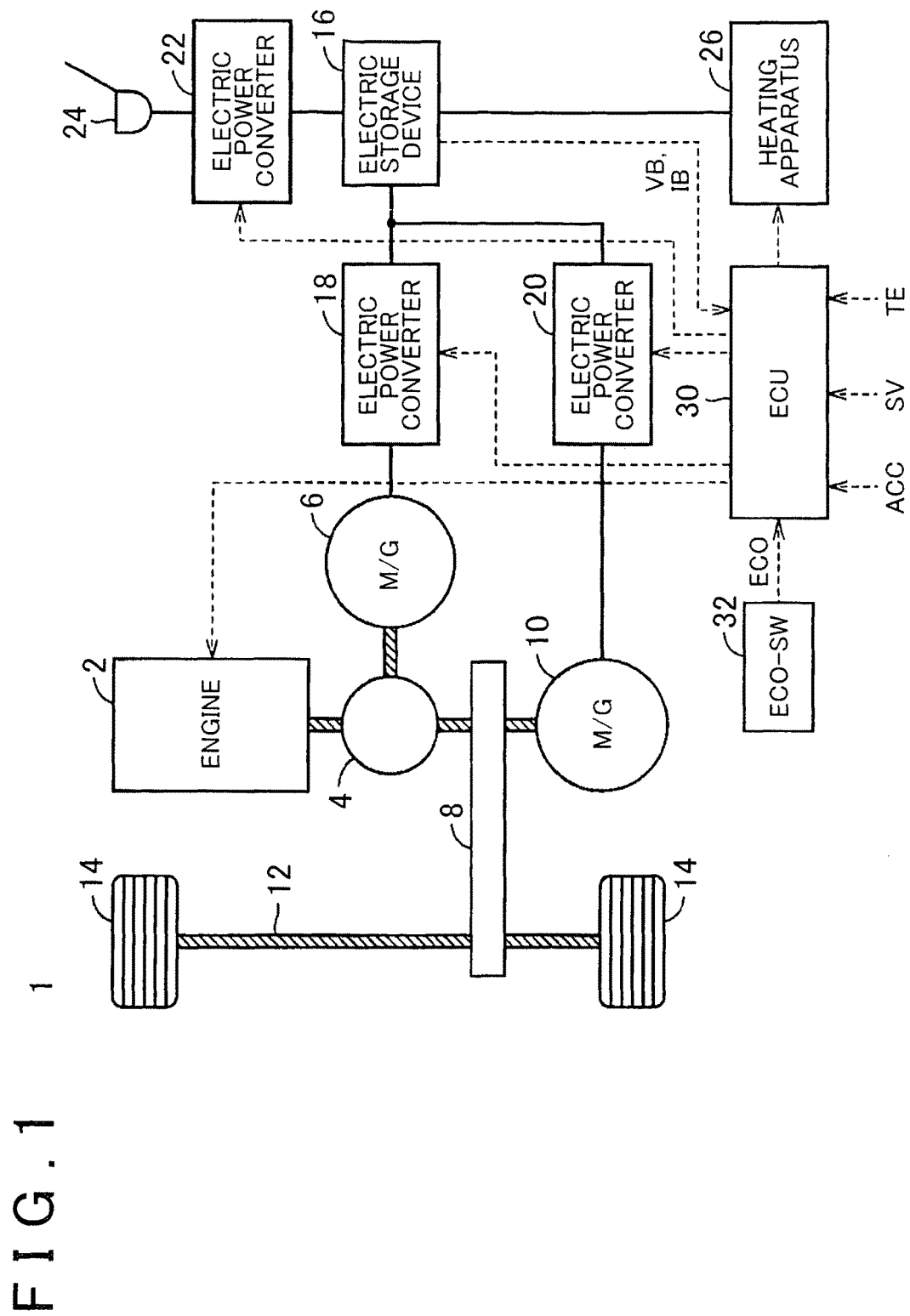
FIG. 1 is an overall block diagram of a hybrid vehicle according to an embodiment of the present invention.

Hereinafter, an embodiment of the present invention will be described in detail with reference to the accompanying drawings. A plurality of modification examples are described in the following description, and appropriate combination of the configurations described in the respective modification examples is scheduled from the initial filing of the application. The same reference numerals are attached to the same or corresponding parts not to repeat description.

FIG. 1 is an overall block diagram of a hybrid vehicle according to an embodiment of the present invention. Referring to FIG. 1, a hybrid vehicle 1 includes an engine 2, a power split device 4, motor generators 6, 10, a transmission gear 8, a driving shaft 12, and vehicle wheels 14. In addition, the hybrid vehicle 1 further includes an electric storage device 16, electric power converters 18, 20, 22, a connecting portion 24, a heating apparatus 26, an electronic control device (hereinafter, referred to as an "ECU (electronic control unit)") 30, and an ECO mode switch 32.

The hybrid vehicle 1 can travel by using a driving force that is output from at least one of the engine 2 and the motor generator 10. The power split device 4 is configured to be capable of splitting the driving force that is generated by the engine 2 into a driving force for driving the driving shaft 12 and a driving force for driving the motor generator 6. The power split device 4 is configured by using, for example, a planetary gear.

The engine 2 is incorporated into the hybrid vehicle 1 as a power source that drives the transmission gear 8 which transmits power to the driving shaft 12 and drives the motor generator 6. The motor generator 6 is incorporated into the hybrid vehicle 1 to operate as a generator that is driven by the engine 2 and operate as an electric motor that is capable of performing start of the engine 2. In addition, the motor generator 10 is incorporated into the hybrid vehicle 1 as a power source that drives the transmission gear 8 which transmits power to the driving shaft 12.

The electric storage device 16 is a rechargeable DC power supply, and is configured from, for example, from a secondary battery of nickel metal hydride, lithium ion, and the like, and a high-capacity capacitor. The electric storage device 16 supplies electric power to the electric power converters 18, 20. In addition, the electric storage device 16 is charged by receiving electric power that is generated during electric power generation by the motor generators 6 and/or 10. In addition, the electric storage device 16 is charged, by using the electric power converter 22, by an external electric power supply (not illustrated) that is electrically connected to the connecting portion 24. Moreover, the electric storage device 16 supplies electric power also to the heating apparatus 26 that heats a vehicle cabin. The electric storage device 16 detects a voltage VB and a current IB of the electric storage device 16 with a voltage sensor and a current sensor (not illustrated), and outputs the detected values to the ECU 30.

The electric power converter 18 converts the electric power that is generated by the motor generator 6 into DC power and outputs the DC power to the electric storage device 16. The electric power converter 20 converts the DC power that is supplied from the electric storage device 16 into AC power and outputs the AC power to the motor generator 10. When the engine 2 is started, the electric power converter 18 converts the DC power that is supplied from the electric storage device 16 into AC power and outputs the AC power to the motor generator 6. In addition, the electric power converter 20 converts the electric power that is generated by the motor generator 10 into DC power and outputs the DC power to the electric storage device 16 during vehicle braking and acceleration reduction on a downward slope. The electric power converters 18, 20 are configured by using, for example, inverters. Converters may be disposed between the electric storage device 16 and the electric power converters 18, 20 to boost input voltages of the electric power converters 18, 20 over the voltage of the electric storage device 16.

The motor generators 6, 10 are AC electric motors, and are configured by using, for example, three-phase AC synchronous electric motors where permanent magnets are embedded in rotors. The motor generator 6 converts kinetic energy that is produced by the engine 2 into electric energy and outputs the electric energy to the electric power converter 18. In addition, the motor generator 6 generates a driving force by using three-phase AC power that is received from the electric power converter 18, and performs the start of the engine 2.

The motor generator 10 generates a driving torque of the vehicle by using the three-phase AC power that is received from the electric power converter 20. In addition, the motor generator 10 converts mechanical energy that is stored in the vehicle as kinetic energy and potential energy into electric energy and outputs the electric energy to the electric power converter 20 during the vehicle braking and the acceleration reduction on the downward slope.

The engine 2 converts thermal energy caused by fuel combustion into kinetic energy of movers such as a piston and the rotor and outputs the converted kinetic energy to the power split device 4. For example, if the mover is the piston and a movement of the mover is a reciprocating motion, the reciprocating motion is converted into a rotational motion via a so-called crank mechanism and the kinetic energy of the piston is transmitted to the power split device 4.

The electric power converter 22 converts electric power from the external electric power supply that is electrically connected to the connecting portion 24 to a voltage level of the electric storage device 16 for output to the electric storage device 16. The electric power converter 22 is configured by using, for example, a rectifier and an inverter. A method for receiving the electric power from the external electric power supply is not limited to contact electric power reception using the connecting portion 24. The electric power from the external electric power supply may be received on a non-contact basis by using an electric power receiving coil or the like instead of the connecting portion 24.

The heating apparatus 26 heats the vehicle cabin of the hybrid vehicle 1. The heating apparatus 26 includes a heat pump cycle that is operated by receiving electric power supply from the electric storage device 16. In addition, the heating apparatus 26 includes a hot water heater that heats the vehicle cabin by using a coolant which is warmed up with the heat of the engine 2. The heat pump cycle does not require an operation of the engine 2, but consumes electric power as a result of the operation. The hot water heater does not consume electric power, but required the coolant to be warmed by the engine 2. The configuration of the heating apparatus 26 will be described in detail later.

The ECO mode switch 32 is a switch that can be operated by a driver. The frequency of the start of the engine 2 is suppressed more when the ECO mode switch 32 is ON than when the ECO mode switch 32 is OFF. Control during the operation of the ECO mode switch 32 will be described in modification example 4 (described later).

The ECU 30 includes a central processing unit (CPU), a storage device, and an input/output buffer, and the like (all not illustrated), and performs control on each of instruments in the hybrid vehicle 1. The control is not limited to software-based processing and can be processing by dedicated hardware (electronic circuit).

The ECU 30 executes travel control, which is one of main controls by the ECU 30, to control traveling of the vehicle by selectively applying a CD mode in which SOC is consumed and a CS mode in which the SOC is maintained within a predetermined range.

Figure 2:
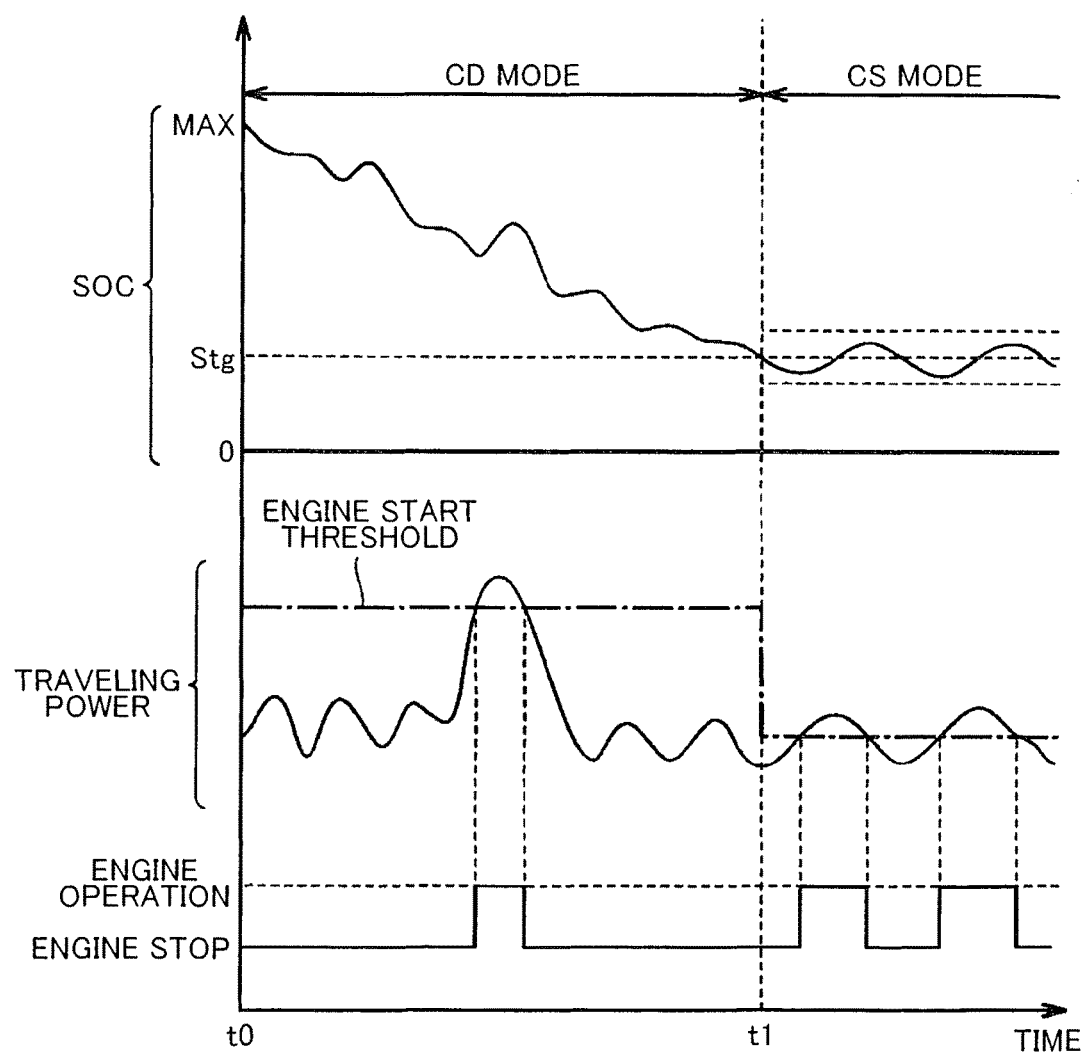
FIG. 2 is a diagram illustrating a CD mode and a CS mode.

FIG. 2 is a diagram illustrating the CD mode and the CS mode. Referring to FIG. 2, the traveling is initiated in the CD mode after the electric storage device 16 is in a fully charged state through external charging (SOC=MAX).

The CD mode is a mode in which the SOC is consumed. Basically, the electric power that is stored in the electric storage device 16 (mainly, electric energy caused by the external charging) is consumed in the CD mode. During the traveling in the CD mode, the engine 2 is not operated to maintain the SOC. In this manner, a rate of discharge is relatively larger than a rate of charge and an overall traveling distance increases so that the SOC decreases as a result, although the SOC temporarily increases due to regenerative electric power that is recovered during deceleration of the vehicle and the like and the electric power that is generated due to the operation of the engine 2.

The CS mode is a mode in which the SOC is maintained within a predetermined range. As an example, when the SOC declines to a predetermined value Stg that represents a decline in the SOC at time t1, the CS mode is selected and then the SOC is maintained within a predetermined range. Specifically, the engine 2 is operated when the SOC declines, and the engine 2 stops when the SOC rises. In other words, the engine 2 is operated to maintain the SOC in the CS mode. Although not particularly illustrated, a switch that can be operated by the driver may be disposed so that the mode is switchable as desired by the driver regardless of the decline in the SOC.

The hybrid vehicle 1 travels by using the motor generator 10 (EV travel), with the engine 2 stopped, when traveling power is smaller than a predetermined engine start threshold. The hybrid vehicle 1 travels with the engine 2 operated (HV travel) when the traveling power exceeds the engine start threshold. In the HV travel, the hybrid vehicle 1 travels by using the driving force of the engine 2 in addition to the driving force of the motor generator 10 or instead of the motor generator 10. The electric power that is generated by the motor generator 6 due to the operation of the engine 2 is directly supplied to the motor generator 10 or is stored in the electric storage device 16.

Herein, the engine start threshold in the CD mode is higher than the engine start threshold in the CS mode. In other words, an area where the hybrid vehicle 1 EV-travels in the CD mode is wider than an area where the hybrid vehicle 1 EV-travels in the CS mode. In this manner, the frequency of the start of the engine 2 is suppressed in the CD mode. In the CS mode, the hybrid vehicle 1 is controlled to travel with high efficiency by using both of the engine 2 and the motor generator 10.

Even in the CD mode, the engine 2 is operated if the traveling power exceeds the engine start threshold. Even if the traveling power does not exceed the engine start threshold, the operation of the engine 2 is allowed in some cases, for example, when hot water heating in which the engine 2 is the heat source is required and when the engine 2 is warmed up. Even in the CS mode, the engine 2 stops if the SOC rises. In other words, the CD mode is not limited to the EV travel when the engine 2 is stopped all the time during the traveling, and the CS mode is not limited to the HV travel when the engine 2 is operated all the time during the traveling. The EV travel and the HV travel are possible in both the CD mode and the CS mode.

Figure 3:
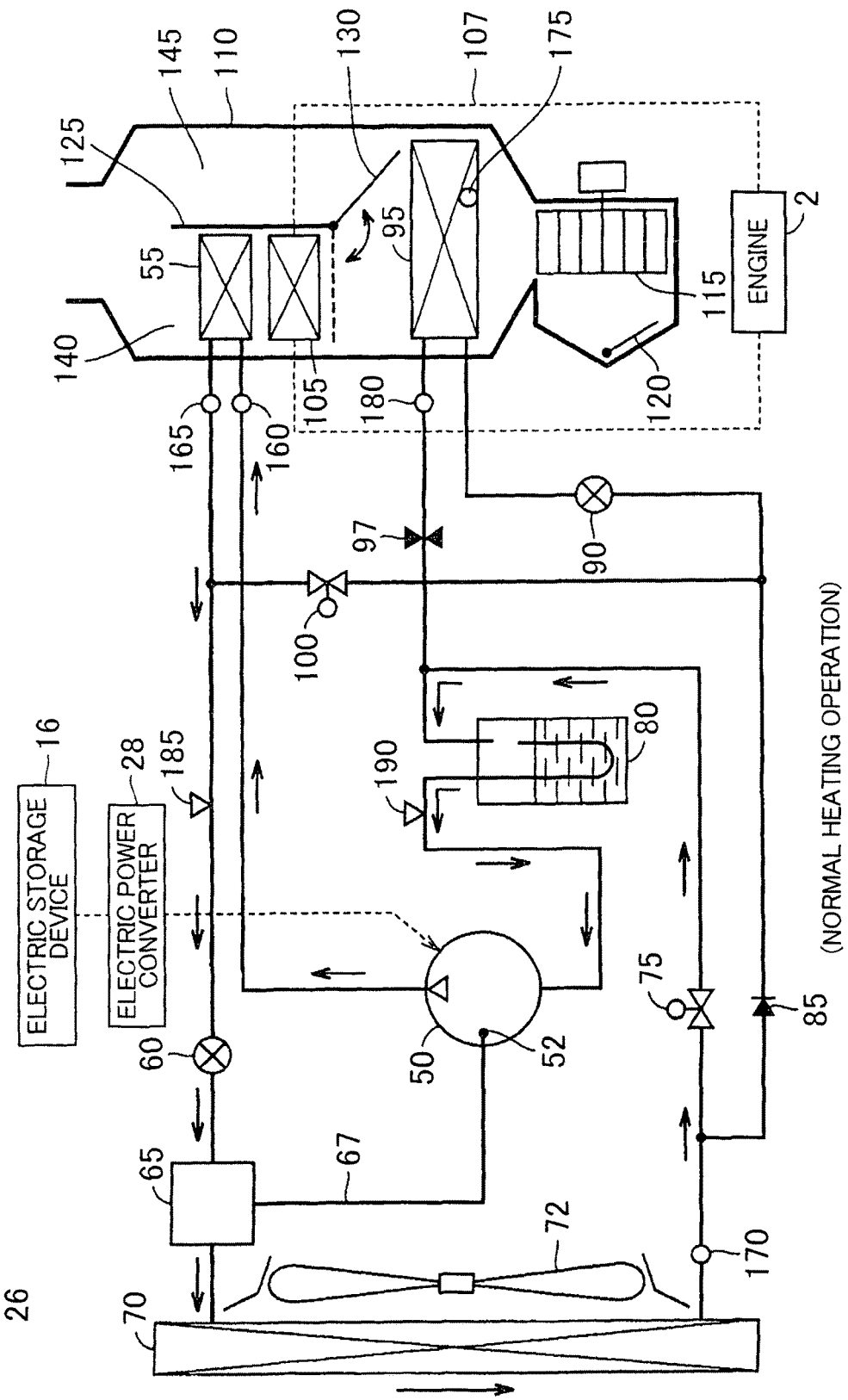
FIG. 3 is a diagram illustrating a configuration example of a heating apparatus illustrated in FIG. 1.

FIG. 3 is a diagram illustrating a configuration example of the heating apparatus 26 illustrated in FIG. 1. Referring to FIG. 3, the heating apparatus 26 includes the heat pump cycle that is operated by receiving electric power supply from the electric storage device 16, the hot water heater that uses the engine 2 as the heat source, and an indoor air conditioning unit.

The heat pump cycle includes an electric power converter 28, an electric compressor 50, an indoor condenser 55, an expansion valve 60, an integration valve 65, a return pipe 67, an outdoor heat exchanger 70, an electromagnetic valve 75, and an accumulator 80. In addition, the heat pump cycle further includes a check valve 85, an expansion valve 90, an evaporator 95, and an evaporation pressure adjustment valve (EPR) 97. Moreover, the heat pump cycle further includes temperature sensors 160, 165, 170, 175, 180, and pressure sensors 185, 190.

The electric compressor 50 is operated by using the electric power that is supplied from the electric storage device 16. The electric compressor 50 takes in a refrigerant, turns the refrigerant into refrigerant gas in an overheated state by adiabatically compressing the refrigerant, and discharges a high-temperature and high-pressure gas-phase refrigerant. The electric compressor 50 circulates the refrigerant to the heat pump cycle by taking in and discharging the refrigerant. The electric compressor 50 has an intermediate port 52 to which the return pipe 67 is connected.

The electric power converter 28 outputs the electric power that is supplied from the electric storage device 16 to the electric compressor 50 through voltage conversion. The electric power converter 28 is configured by using, for example, an inverter.

The indoor condenser 55 is connected to a refrigerant output side of the electric compressor 50, and is disposed in a casing 110 of the indoor air conditioning unit. The indoor condenser 55 heats blowing air by performing heat exchange between the refrigerant that flows through the indoor condenser 55 and the blowing air that flows in the casing 110.

The expansion valve 60 is disposed in piping between the indoor condenser 55 and the integration valve 65, and changes a high-pressure liquid-phase refrigerant which passes through the indoor condenser 55 into low-temperature and low-pressure wet steam in a gas-liquid mixed state through expansion by injection from a small hole and decompression of a refrigerant liquid. The expansion valve 60 is configured by using, for example, an electric expansion valve.

The integration valve 65 is arranged between the expansion valve 60 and the outdoor heat exchanger 70, and is disposed so that the heat pump cycle can be operated in a gas injection (GI) operation mode (described later). When the heat pump cycle performs a normal heating operation (operation that is not in the GI operation mode), the integration valve 65 outputs the refrigerant that is output from the expansion valve 60 to the outdoor heat exchanger 70. When the heat pump cycle performs the GI heating operation, the integration valve 65 performs gas-liquid separation on the refrigerant that is output from the expansion valve 60 and outputs the gas-phase refrigerant which is separated to the return pipe 67. The return pipe 67 is connected to the intermediate port 52 of the electric compressor 50, and gas-phase refrigerant that is separated by the integration valve 65 during the GI heating operation returns to the electric compressor 50 through the return pipe 67.

The outdoor heat exchanger 70 is connected to a refrigerant output side of the expansion valve 60 and is disposed, for example; behind a front bumper of the vehicle. The outdoor heat exchanger 70 performs heat exchange between the refrigerant that flows through the outdoor heat exchanger 70 and air outside the vehicle (outside air) that is blown from a blower fan 72. The refrigerant absorbs heat of the outside air by passing through the outdoor heat exchanger 70.

The electromagnetic valve 75 is configured to be switchable between full opening and full closing. The electromagnetic valve 75 is controlled to be fully opened during the heating operation (including the GI heating operation), and is controlled to be fully closed during a cooling operation, a dehumidification operation, and stop of the electric compressor 50.

The accumulator 80 is arranged on a refrigerant flow upstream side with respect to the electric compressor 50. The accumulator 80 separates the liquid-phase refrigerant and the gas-phase refrigerant from each other, and takes in only the gas-phase refrigerant to the electric compressor 50. This is because component parts of the electric compressor 50 such as a valve may be damaged due to liquid compression when the liquid-phase refrigerant is taken into the electric compressor 50.

The check valve 85 is disposed in piping that branches from piping between the outdoor heat exchanger 70 and the electromagnetic valve 75; and allows flow of the refrigerant which is output from the outdoor heat exchanger 70 while prohibiting flow in a reverse direction. The expansion valve 90 is disposed in piping between the check valve 85 and the evaporator 95, and outputs the refrigerant that passes through the outdoor heat exchanger 70 to the evaporator 95 through decompression and expansion. The expansion valve 90 is configured by using, for example, an electric expansion valve.

The evaporator 95 is connected to a refrigerant output side of the expansion valve 90, and is disposed in the casing 110 of the indoor air conditioning unit. The evaporator 95 cools the blowing air by performing heat exchange between the refrigerant that flows through the evaporator 95 and the blowing air that flows in the casing 110. The EPR 97 is disposed in piping between the evaporator 95 and the accumulator 80, and controls evaporation pressure of the evaporator 95.

An electromagnetic valve 100 is disposed in a bypass pipe that is arranged between outlet side piping of the indoor condenser 55 and inlet side piping of the expansion valve 90. The bypass pipe can be used in the dehumidification operation (not illustrated), and the electromagnetic valve 100 is closed during a no-dehumidification heating operation (including the GI heating operation).

The hot water heater includes a heater core 105. The heater core 105 is disposed in coolant piping 107 of the engine 2, and is arranged in the casing 110 of the indoor air conditioning unit. The heater core 105 heats the blowing air by performing heat exchange between an engine coolant that flows in the heater core 105 and the blowing air that flows in the casing 110. In other words, the heater core 105 uses the engine 2 as the heat source, and the hot water heater does not use electric power. The heating operation by the hot water heater and the operation of the engine 2 do not necessarily coincide with each other. In other words, even when the engine 2 is stopped, the heating by the hot water heater is possible if the engine coolant is warmed by the prior operation of the engine 2.

The indoor air conditioning unit includes the casing 110, a blower 115, an inside/outside air switching door 120, a partition wall 125, and an air mix door 130. The casing 110 forms a path of the blowing air that is blown to the vehicle cabin. The blower 115 produces the blowing air that is supplied to the vehicle cabin through the casing 110. The number of revolutions (blast volume) of the blower 115 is controlled according to a required air volume. The inside/outside air switching door 120 switches or mixes air inside the vehicle (inside air) with the air outside the vehicle (outside air) for introduction into the casing 110.

The evaporator 95 is arranged on an air flow downstream side of the blower 115. The partition wall 125 and the air mix door 130 are disposed on an air flow downstream side of the evaporator 95. A heating air duct 140 and a bypass air duct 145 are formed in the casing 110 by the partition wall 125.

The heater core 105 and the indoor condenser 55 are arranged in the heating air duct 140. The blowing air that passes through the heating air duct 140 is heated by the heater core 105 if the temperature of the engine coolant is higher than the temperature of the blowing air and is heated by the indoor condenser 55 if the heat pump cycle is in operation. Although the heater core 105 is arranged on an air flow upstream side of the indoor condenser 55 in the drawing, the order in which the indoor condenser 55 and the heater core 105 are arranged is not particularly limited. The bypass air duct 145 is a path that allows the blowing air which passes through the evaporator 95 to be guided to the vehicle cabin without passing through the indoor condenser 55.

The blowing air that passes through the heating air duct 140 and the blowing air that passes through the bypass air duct 145 are mixed downstream of the partition wall 125 and supplied to the vehicle cabin. Accordingly, the temperature of the blowing air that is supplied to the vehicle cabin changes according to the air volume ratio between the blowing air that passes through the heating air duct 140 and the blowing air that passes through the bypass air duct 145.

The air mix door 130 is configured to be capable of changing the air volume ratio between the blowing air that passes through the heating air duct 140 and the blowing air that passes through the bypass air duct 145, and changes the air volume ratio according to heating temperature.

Two heating operations are possible in the heat pump cycle described above, one being the normal heating operation and the other being the gas injection (GI) heating operation in which the heating capacity is higher than in the normal heating operation.

Figure 4:
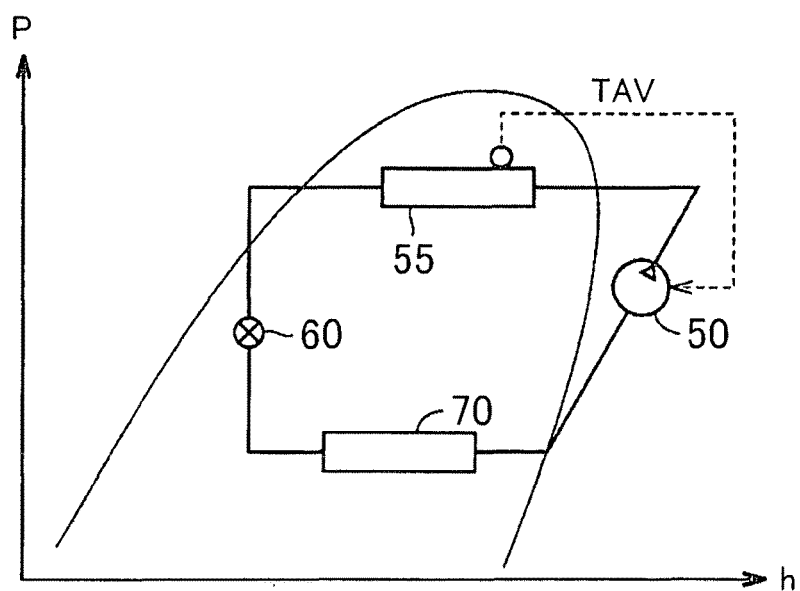
FIG. 4 is a Mollier diagram at a time when a heat pump cycle performs a normal heating operation.

FIG. 4 is a Mollier diagram at a time when the heat pump cycle that is illustrated in FIG. 3 performs the normal heating operation. In FIG. 3, the flow of the refrigerant during the normal heating operation is illustrated with an arrow. Referring to FIGS. 3 and 4, the electromagnetic valve 75 is open and the electromagnetic valve 100 is closed during the normal heating operation. In addition, the refrigerant does not flow from the integration valve 65 to the electric compressor 50.

In this manner, the refrigerant flows in the order of the electric compressor 50, the indoor condenser 55, the expansion valve 60, and the outdoor heat exchanger 70, and returns to the electric compressor 50 through the electromagnetic valve 75 and the accumulator 80. Since the electromagnetic valve 75 is open, the refrigerant does not flow out to the check valve 85 side. The temperature TAV of the indoor condenser 55 is estimated (or detected), and the number of revolutions of the electric compressor 50 is controlled according to the temperature TAV.

Figure 5:
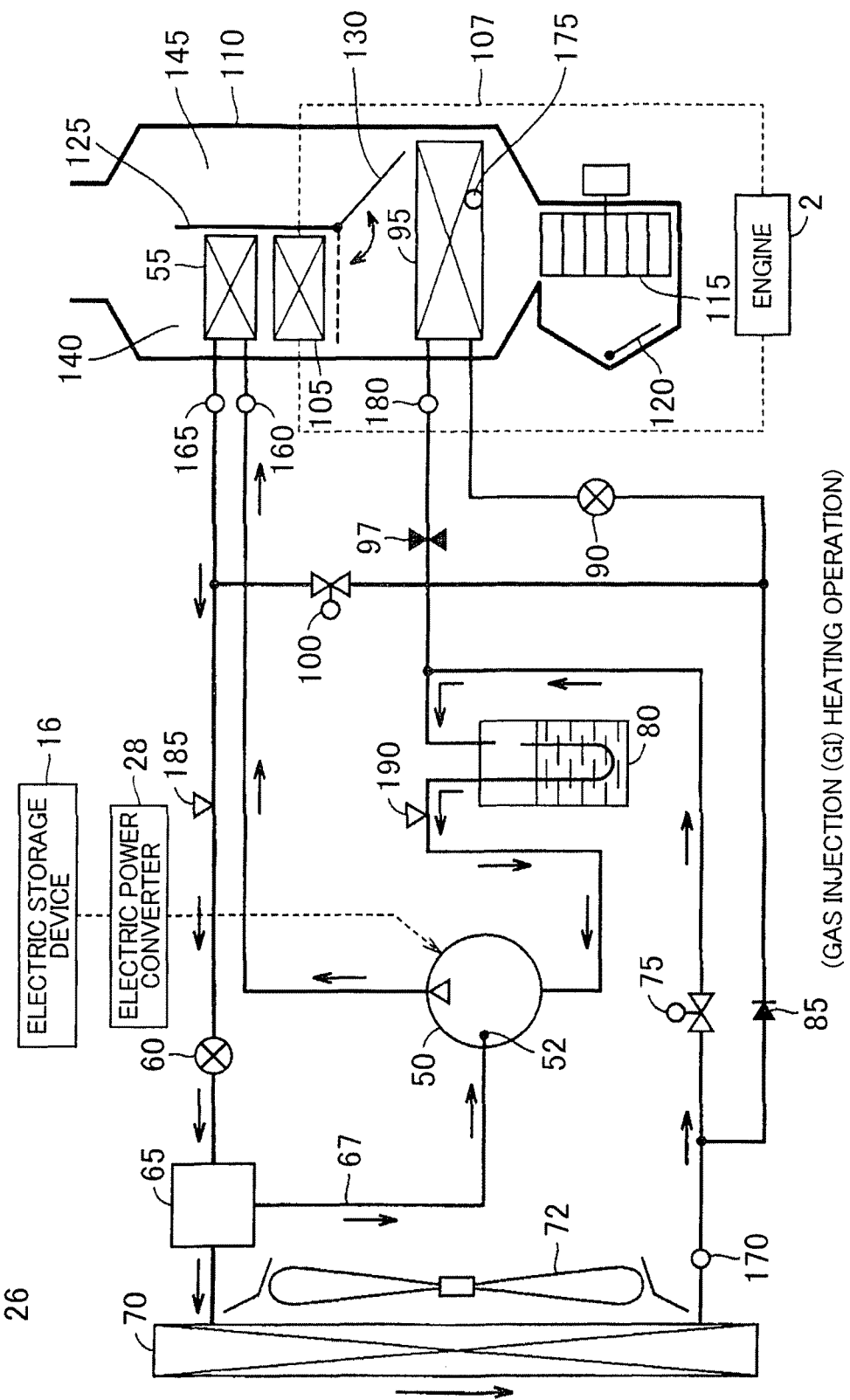
FIG. 5 is a diagram illustrating refrigerant flow during a gas injection (GI) heating operation.
Figure 6:
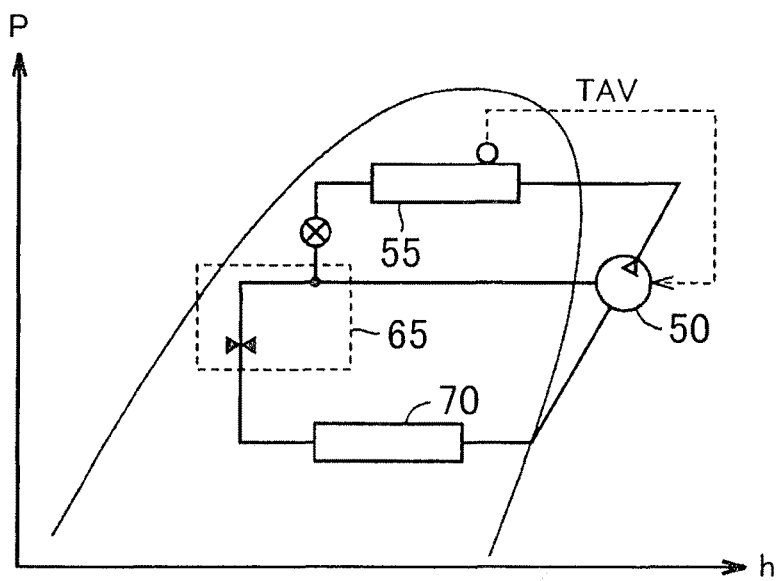
FIG. 6 is a Mollier diagram at a time when the heat pump cycle performs the GI heating operation.

FIG. 5 is a diagram illustrating the refrigerant flow during the GI heating operation. FIG. 6 is a Mollier diagram at a time when the heat pump cycle performs the GI heating operation. Referring to FIGS. 5 and 6, the electromagnetic valve 75 is open and the electromagnetic valve 100 is closed even during the GI heating operation. The integration valve 65 performs gas-liquid separation on the refrigerant that is output from the expansion valve 60, and outputs the gas-phase refrigerant which is separated to the return pipe 67.

In this manner, the refrigerant flows through the regular route of the normal heating operation illustrated in FIGS. 3 and 4, and flows also from the integration valve 65 to the intermediate port 52 of the electric compressor 50. During the GI heating operation, the amount of the refrigerant that flows into the electric compressor 50 increases, and thus the heating capacity is improved more than during the normal heating operation.

Although the heating capacity is higher during the GI heating operation than during the normal heating operation, a load on the electric compressor 50 increases during the GI heating operation due to the increase in the amount of the refrigerant which flows into the electric compressor 50, and thus the electric power consumption by the electric compressor 50 is greater than during the normal heating operation. In addition, the electric power consumption increases even during switching from the normal heating operation to the GI heating operation because a transitional change is generated in the number of revolutions of the electric compressor 50.

The electric power consumption by the heating apparatus 26 (electric power consumption by the heat pump cycle) results in the decline in the SOC of the electric storage device 16. Then, the engine 2 repeats start and stop frequently in the CS mode, in which the SOC is maintained within a predetermined range, and riding comfort may be compromised. In this embodiment, the GI heating operation is limited during the CS mode so as to suppress the electric power consumption by the heating apparatus 26. The limitation of the GI heating operation includes limiting the operating time of the GI heating operation and limiting the amount of the refrigerant returning from the integration valve 65 to the electric compressor 50 as well as prohibiting the GI heating operation.

The above-described problem with the CS mode does not occur in the CD mode, and thus the GI heating operation is performed if a high heating capacity is required. Accordingly, the GI heating operation is more limited in the CS mode than in the CD mode. In this manner, the electric power consumption that is required for the heating is suppressed more in the CS mode than in the CD mode. As a result, the frequent repetition of the start and stop of the engine 2 can be suppressed.

Although the engine 2 is not necessarily operated in the CS mode, the engine 2 repeats the operation and stop so as to maintain the SOC within a predetermined range and the temperature of the coolant of the engine 2 increases. Accordingly, the hot water heating capacity is normally high in the CS mode regardless of the operation/stop of the engine 2. However, even in the CS mode, there may be case where the engine coolant is not sufficiently high, such as immediately after the switching from the CD mode, and the engine 2 is started for hot water heating in a case where a required heating capacity cannot be ensured with the normal heating operation by the heat pump cycle while the engine 2 is stopped. In a case where a required heating capacity cannot be ensured with the normal heating operation as described above in the CD mode, the GI heating operation is performed without the engine 2 being started. In this manner, the GI heating operation with greater electric power consumption than in the CD mode is limited in the CS mode, and the hot water heating in which the engine 2 is used as the heat source is preferentially used.

Referring briefly back to FIG. 3, the heat pump cycle is also capable of the cooling operation. During the cooling operation, the electromagnetic valve 75 is closed and the air mix door 130 blocks the flow of the blowing air to the heating air duct 140. In this manner, the refrigerant flows in the order of the electric compressor 50, the indoor condenser 55, the expansion valve 60, the outdoor heat exchanger 70, the check valve 85, the expansion valve 90, and the evaporator 95, and returns to the electric compressor 50 through the accumulator 80. During the cooling operation, the flow of the blowing air to the heating air duct 140 is blocked, and thus no heat exchange is performed in the heating air duct 140. The blowing air flows also to the heating air duct 140 by the air mix door 130 during the cooling operation, and thus the dehumidification heating operation is also possible.

Figure 7:
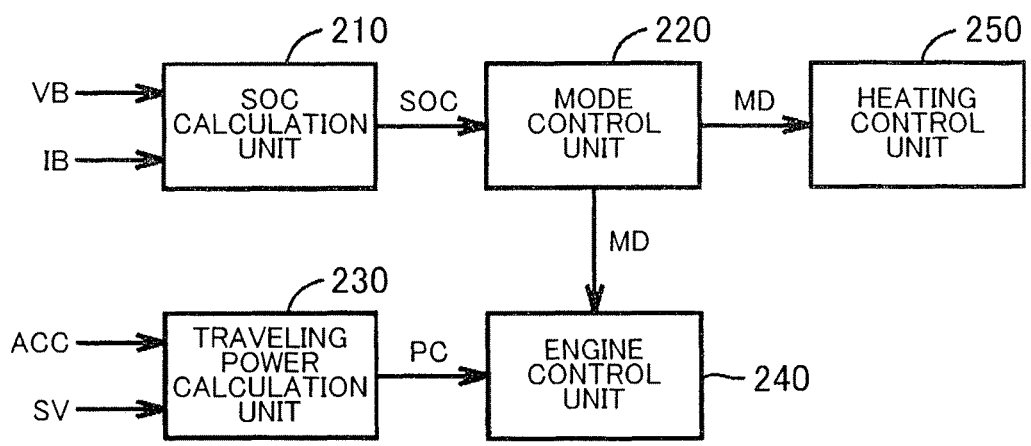
FIG. 7 is a functional block diagram of a part of an ECU illustrated in FIG. 1 that relates to heating control.

FIG. 7 is a functional block diagram of a part of the ECU 30 illustrated in FIG. 1 that relates to heating control. Referring to FIG. 7, the ECU 30 includes an SOC calculation unit 210, a mode control unit 220, a traveling power calculation unit 230, an engine control unit 240, and a heating control unit 250.

The SOC calculation unit 210 calculates the SOC of the electric storage device 16 based on the voltage VB and the current IB of the electric storage device 16. Various known methods can be used as a method for calculating the SOC.

The mode control unit 220 performs mode selection of whether to apply the CD mode or apply the CS mode based on the SOC that is calculated by the SOC calculation unit 210. Basically, the mode control unit 220 selects the CD mode when the external charging is completed. The mode control unit 220 maintains the CD mode until the SOC declines to the predetermined value Stg (FIG. 2), and switches to the CS mode when the SOC declines to the predetermined value Stg. When the mode switching is required by the switch that can be operated by the driver, the mode control unit 220 switches the modes according to the request even if the SOC does not decline to the predetermined value Stg.

The traveling power calculation unit 230 calculates traveling power PC of the vehicle based on the accelerator opening degree ACC that is dependent on the accelerator pedal operation amount, a vehicle speed SV, and the like. The engine control unit 240 sets a threshold of the start of the engine 2 based on a mode signal MD which is received from the mode control unit 220. As illustrated in FIG. 2, the engine start threshold in the CD mode is set to be higher in value than the engine start threshold in the CS mode. Then, the engine control unit 240 compares the traveling power PC that is calculated by the traveling power calculation unit 230 to the engine start threshold, and operates the engine 2 in a case where the traveling power PC exceeds the engine start threshold. In addition, the engine control unit 240 operates the engine 2 in a case where the SOC declines so as to maintain the SOC within a predetermined range in the CS mode. In addition, the engine control unit 240 also operates the engine 2 in a case where the start of the engine 2 is required by the heating control unit 250 so as to execute the hot water heating in which the engine 2 is used as the heat source.

The heating control unit 250 controls the heating apparatus 26 to execute the heating operation in a case where heating of the vehicle cabin is required and a target blow-out temperature is higher than an outside air temperature. When the outside air temperature is higher than the target blow-out temperature, the heating operation does not have to be executed and the outside air is taken in (ventilation).

When the difference between the target blow-out temperature and the outside air temperature is large (target blow-out temperature>outside air temperature) and a high heating capacity is required, the heating control unit 250 controls the heating apparatus 26 so that the heat pump cycle performs the GI heating operation. Herein, the heating control unit 250 controls the heating apparatus 26 to limit the GI heating operation (for example, to prohibit the GI heating operation) when the mode signal MD that is received from the mode control unit 220 shows the CS mode even though the high heating capacity is required. In addition, the heating control unit 250 requires the start of the engine 2 to the engine control unit 240 so as to increase the capacity of the hot water heater when the heating capacity is insufficient due to the limitation of the GI heating operation.

Figure 8:
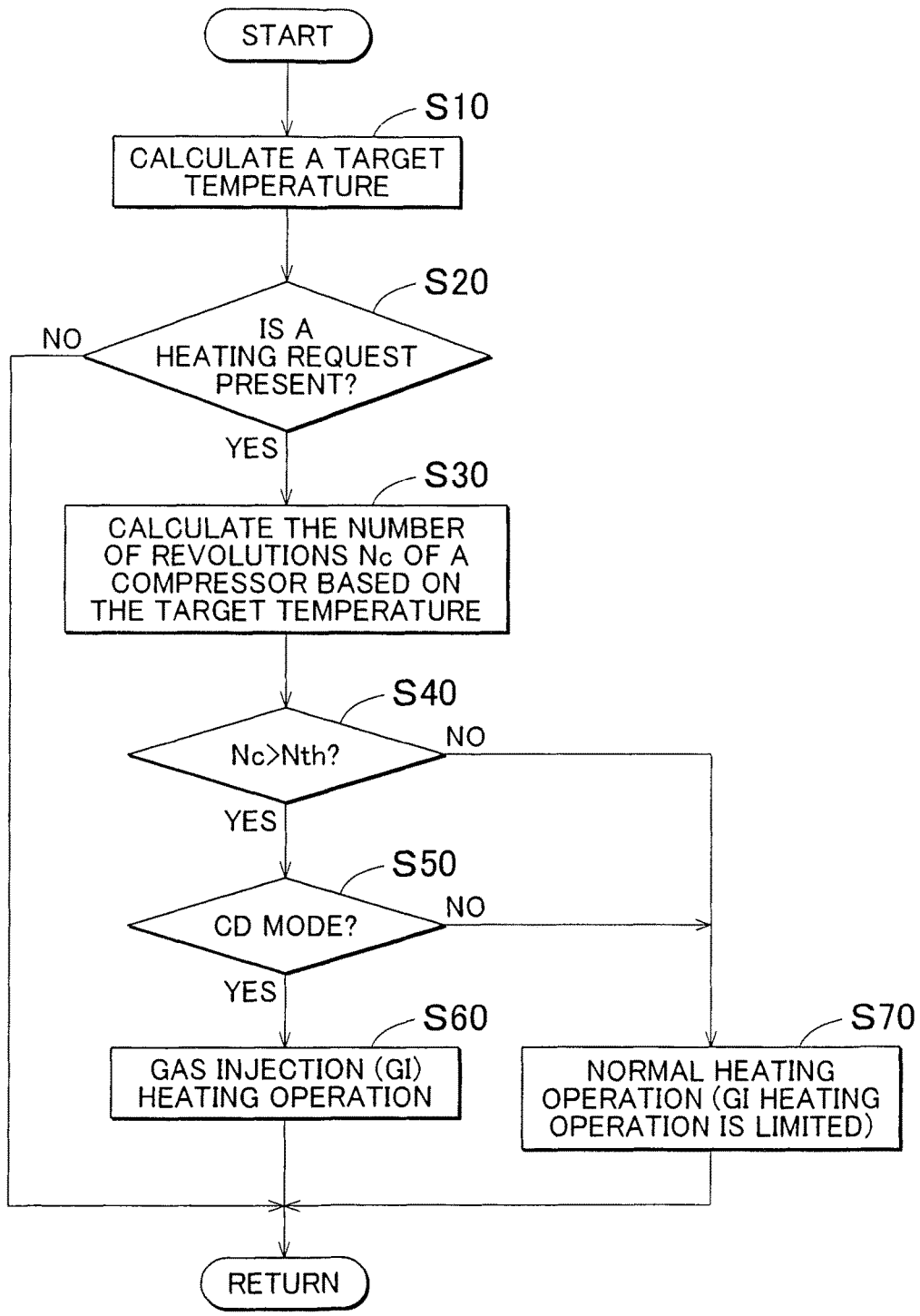
FIG. 8 is a flowchart illustrating a processing procedure of the heating control that is executed by the ECU.

FIG. 8 is a flowchart illustrating a processing procedure of the heating control that is executed by the ECU 30. This flowchart is realized by executing a program that is stored in advance on the ECU 30 at a predetermined period. Alternatively, the processing can also be realized by establishing dedicated hardware (electronic circuit) for some or all of the steps.

Referring to FIG. 8, the ECU 30 calculates a target temperature of the heating apparatus 26 (Step S10). For example, the target blow-out temperature of the heating apparatus 26 is calculated. The target blow-out temperature can be calculated based on a set temperature of the heating apparatus 26 and the temperature of the inside air or the outside air. Then, the ECU 30 determines whether or not the heating is required (Step S20). Herein, the heating is determined to be required when the heating is required by a user and the target blow-out temperature is higher than the outside air temperature. The ECU 30 executes a series of processing as follows when the heating is not required (Step S20: NO).

When it is determined that the heating is required in Step S20 (Step S20: YES), the ECU 30 calculates the number of revolutions Nc of the electric compressor 50 based on the target temperature that is calculated in Step S10 (Step S30). Specifically, the ECU 30 calculates the number of revolutions Nc based on the difference between the target temperature and the temperature of the inside air or the outside air. Then, the ECU 30 determines whether or not the number of revolutions Nc of the electric compressor 50 that is calculated in Step S30 is higher than a predetermined determination value Nth (Step S40). The determination value Nth is a value that is used to determine whether or not the high heating capacity is required, and is set to a value that is large to some extent.

The ECU 30 determines whether or not the CD mode is selected (Step S50) when the number of revolutions Nc of the electric compressor 50 is determined to be higher than the determination value Nth in Step S40 (Step S40: YES), that is, when it is determined that the high heating capacity is required. When the CD mode is selected (Step S50: YES), the ECU 30 controls the heating apparatus 26 to perform the GI heating operation with the high heating capacity (Step S60).

When the number of revolutions Nc is determined to be equal to or less than the determination value Nth in Step S40 (Step S40: NO) or it is determined that the CS mode is selected in Step S50 (Step S50: NO), the ECU 30 controls the heating apparatus 26 to perform the normal heating operation (Step S70). In other words, when the CS mode is selected against the CD mode, the GI heating operation is limited regardless of the determination that the high heating capacity is required. In Step S70, the GI heating operation is prohibited as an example of the limitation of the GI heating operation, and the normal heating operation is performed.

In a case where the required heating capacity cannot be ensured with the normal heating operation by the heat pump cycle with the engine 2 stopped and the temperature of the engine coolant low in Step S70, the ECU 30 starts the engine 2 so as to ensure the heating capacity by the hot water heating.

As described above, the GI heating operation with the greater electric power consumption than in the CD mode is limited when the CS mode is selected according to this embodiment, and thus the decline in the SOC is suppressed in the CS mode. In this manner, the chance of starting the engine 2 in the CS mode can be suppressed. In the CD mode, the comfort of the driver can be maintained with the engine 2 not started by the heating by the heat pump cycle. As described above, the heating control that is appropriate to the CD mode/CS mode can be executed according to this embodiment.

In addition, from another point of view, the heating by the hot water heater in which the engine 2 is used as the heat source is preferentially used in the CS mode and exhaust heat of the engine 2 is more effectively used in the heating than in the CD mode according to this embodiment. In this manner, the electric power consumption by the heat pump cycle is suppressed in the CS mode, and the decline in the SOC in the CS mode can be suppressed.

Hereinafter, modification example 1 will be described. In the embodiment described above, the normal heating operation by the heat pump cycle is performed in a case where the high heating capacity is required to the heating apparatus 26. However, the hot water heating may also be performed with the normal heating operation also limited (for example, prohibited) in the CS mode.

Figure 9:
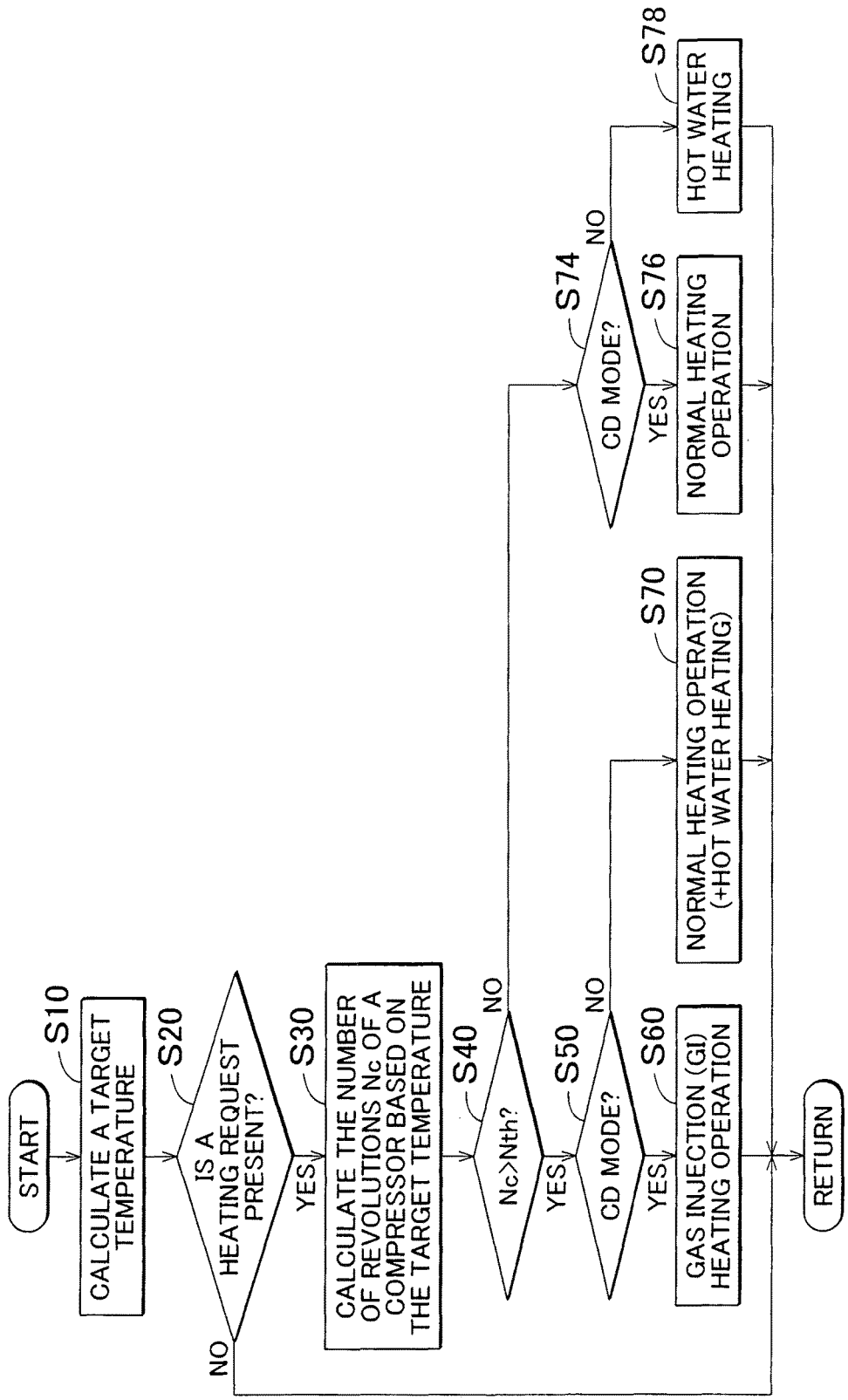
FIG. 9 is a flowchart illustrating a processing procedure of heating control that is executed by an ECU according to modification example 1.

FIG. 9 is a flowchart illustrating a processing procedure of heating control that is executed by the ECU 30 according to modification example 1. Referring to FIG. 9, this flowchart further includes Steps S74 to 78 in addition to the flowchart illustrated in FIG. 8. In other words, the ECU 30 determines whether or not the CD mode is selected (Step S74) in a case where it is determined that the number of revolutions Nc of the electric compressor 50 is equal to or less than the determination value Nth in Step S40 (Step S40: NO), that is, the high heating capacity is not required.

When the CD mode is selected (Step S74: YES), the ECU 30 controls the heating apparatus 26 so that the normal heating operation by the heat pump cycle is performed (Step S76). When the CS mode is selected (Step S74: NO), the ECU 30 controls the heating apparatus 26 to perform the hot water heating (Step S78). In other words, when the CS mode is selected against the CD mode, the hot water heating is preferentially applied and the heating operation by the heat pump cycle is limited.

According to modification example 1, the electric power consumption that is required for the heating can be more suppressed in the CS mode than in the CD mode even in a case where the high heating capacity is not required to the heating apparatus 26. Accordingly, the decline in the SOC in the CS mode is suppressed, and the chance of starting the engine 2 in the CS mode can be suppressed.

Hereinafter, modification example 2 will be described. As a simpler method, the heating operation by the heat pump cycle may be performed in the CD mode and the hot water heating may be performed in the CS mode. The heating operation by the heat pump cycle may include the normal heating operation and the GI heating operation as in the above-described embodiment, or may include only the normal heating operation.

Figure 10:
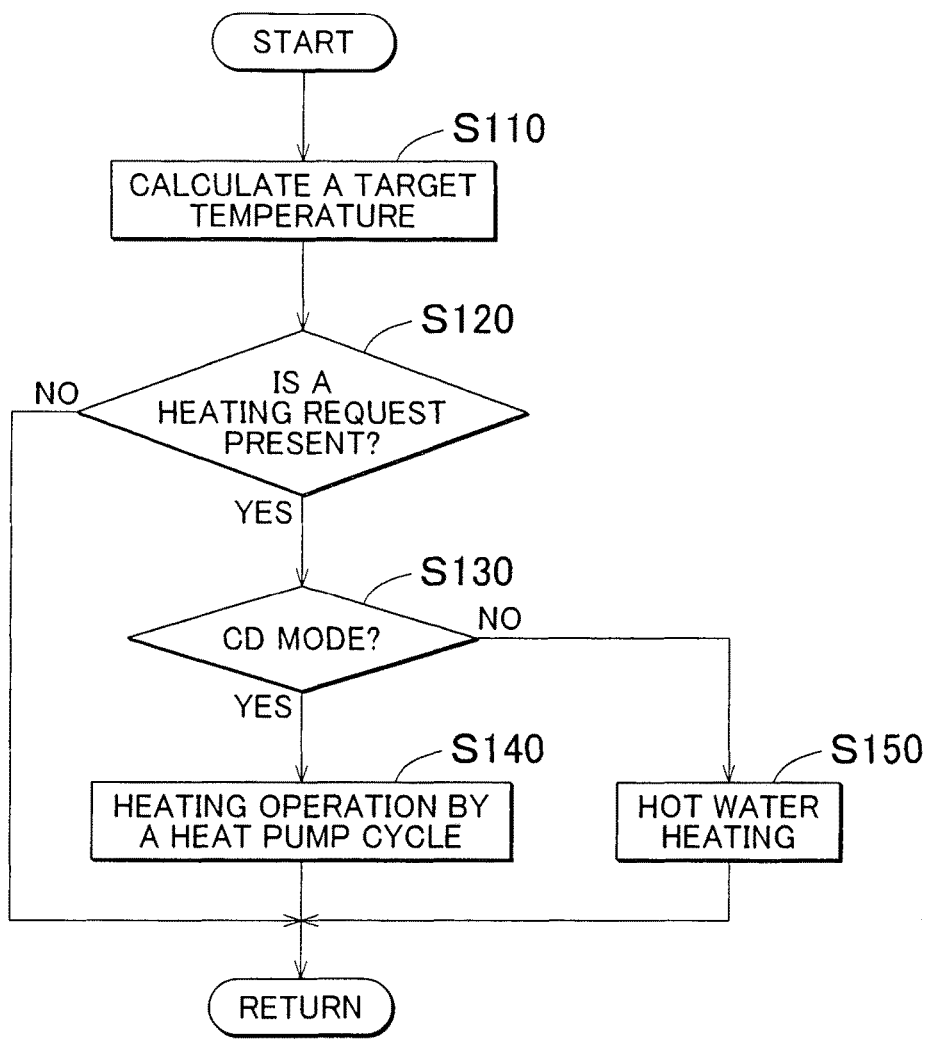
FIG. 10 is a flowchart illustrating a processing procedure of heating control that is executed by an ECU according to modification example 2.

FIG. 10 is a flowchart illustrating a processing procedure of heating control that is executed by the ECU 30 according to modification example 2. This flowchart is also realized by executing a program that is stored in advance on the ECU 30 at a predetermined period. Alternatively, the processing can also be realized by establishing dedicated hardware (electronic circuit) for some or all of the steps.

Referring to FIG. 10, the ECU 30 calculates the target temperature of the heating apparatus 26 (Step S110), and then determines whether or not the heating is required (Step S120). Steps S110 and S120 are the same as Steps S10 and S20 illustrated in FIG. 8, and thus description will not be repeated.

When it is determined that the heating is required in Step S120 (Step S120: YES), the ECU 30 determines whether or not the CD mode is selected (Step S130). When the CD mode is selected (Step S130: YES), the ECU 30 controls the heating apparatus 26 so that the heating operation by the heat pump cycle is performed (Step S140).

When it is determined that the CS mode is selected in Step S130 (Step S130: NO), the ECU 30 controls the heating apparatus 26 to perform the hot water heating in which the engine 2 is used as the heat source (Step S150). In other words, when the CS mode is selected against the CD mode, the hot water heating is preferentially applied and the heating operation by the heat pump cycle is limited.

As described above, the engine 2 is not necessarily operated in Step S150, and the engine 2 remains stopped if the temperature of the engine coolant is sufficiently high. In the CS mode, the engine 2 appropriately repeats the start/stop so as to maintain the SOC and the temperature of the engine coolant is likely to be high, and thus the frequency with which the engine 2 is started so as to ensure the heating capacity is not high.

As described above, the electric power consumption that is required for the heating can be more suppressed in the CS mode than in the CD mode even in modification example 2. Accordingly, the decline in the SOC in the CS mode is suppressed, and the chance of starting the engine 2 in the CS mode can be suppressed.

Hereinafter, modification example 3 will be described. Even in the CS mode, the temperatures of the engine 2 and the coolant may decline immediately after the switching from the CD mode and in a case where the EV travel continues for a long period of time. The heating capacity of the heating apparatus 26 declines if the GI heating operation is limited in this state. Even in the CS mode, the GI heating operation may be performed in a case where the temperature of the engine coolant is low.

Figure 11:
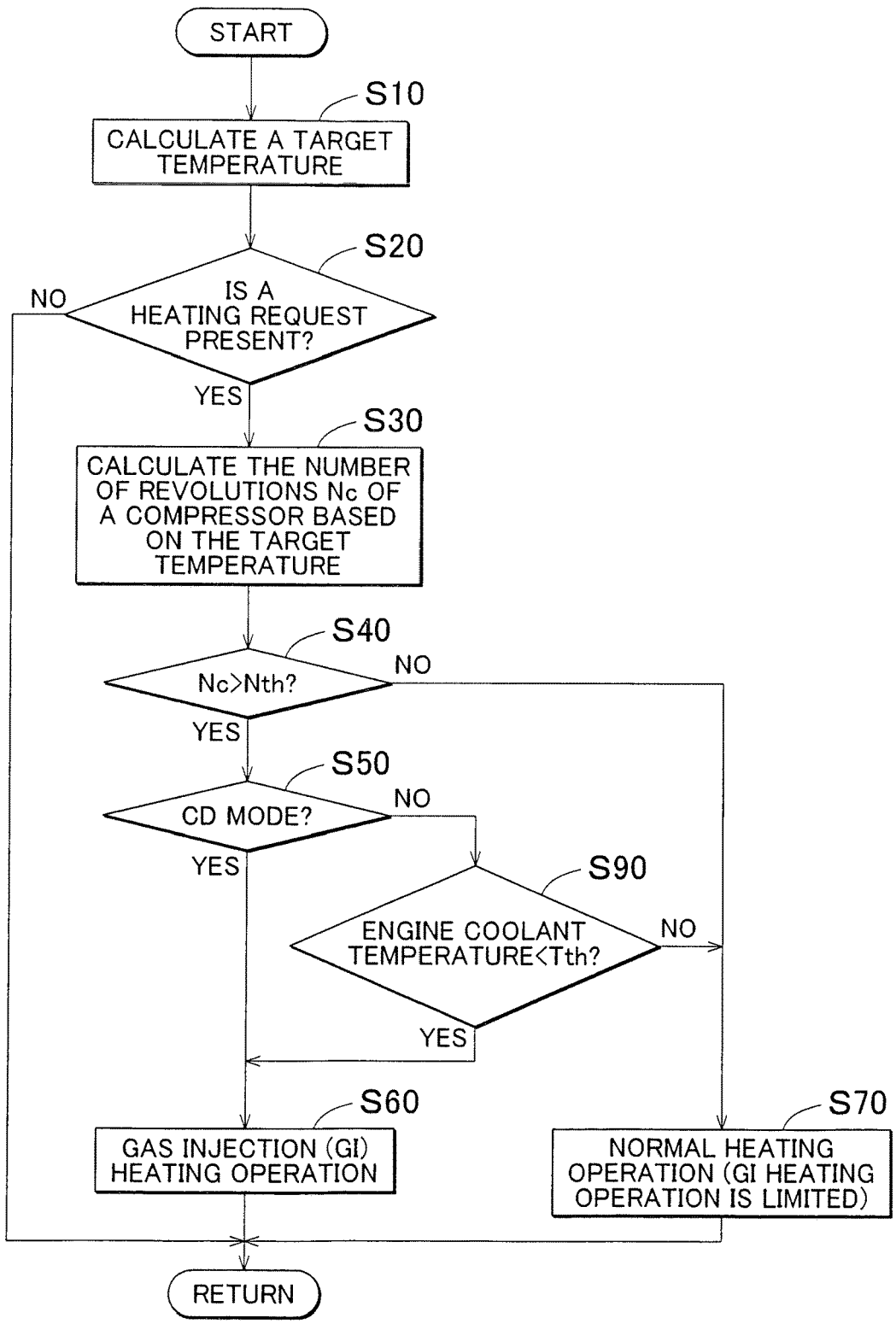
FIG. 11 is a flowchart illustrating a processing procedure of heating control that is executed by an ECU according to modification example 3.

FIG. 11 is a flowchart illustrating a processing procedure of heating control that is executed by the ECU 30 according to modification example 3. Referring to FIG. 11, this flowchart further includes Step S90 in addition to the flowchart illustrated in FIG. 8.

In other words, the ECU 30 determines whether or not the temperature of the coolant of the engine 2 is lower than a predetermined temperature Tth (Step S90) when it is determined that the CS mode is selected in Step S50 (Step S50: NO). The predetermined temperature Tth is a temperature of the coolant at which the heating capacity during the GI heating operation can be ensured, and is set based on, for example, an estimated temperature of the indoor condenser 55 during the GI heating operation.

When the temperature of the engine coolant is determined to be lower than the predetermined temperature Tth in the Step S90 (Step S90: YES), the ECU 30 allows the process to proceed to Step S60 and the GI heating operation is performed. When it is determined that the temperature of the engine coolant is equal to or higher than the predetermined temperature Tth in Step S90 (Step S90: NO), the ECU 30 allows the process to proceed to Step S70 and the normal heating operation is performed.

Even in the CS mode, the GI heating operation is not limited in a case where the temperature of the engine coolant is low according to modification example 3 as described above. As such, the decline in the heating capacity of the heating apparatus 26 can be suppressed.

Modification example 3 may be combined with modification example 1 and modification example 2 described above. In other words, referring back to FIG. 9, the ECU 30 may allow the process to proceed to Step S60 and the GI heating operation may be performed in a case where it is determined that the CS mode is selected in Step S50 (Step S50: NO) and the temperature of the engine coolant is lower than the predetermined temperature Tth. In addition, the ECU 30 may allow the process to proceed to Step S76 and the normal heating operation by the heat pump cycle may be performed in a case where it is determined that the CS mode is selected in Step S74 (Step S74: NO) and the temperature of the engine coolant is lower than the predetermined temperature Tth.

Moreover, referring back to FIG. 10, the ECU 30 may allow the process to proceed to Step S140 and the heating operation by the heat pump cycle may be performed in a case where it is determined that the CS mode is selected in Step S130 (Step S130: NO) and the temperature of the engine coolant is lower than the predetermined temperature Tth.

Hereinafter, modification example 4 will be described. Although the GI heating operation is performed in the CD mode in the above-described embodiment, the GI heating operation is performed only in a case where an ECO mode is selected in the CD mode according to modification example 4.

Referring back to FIG. 1, the frequency of the start of the engine 2 is more suppressed when the ECO mode switch 32 is ON than when the ECO mode switch 32 is OFF. The ECO mode can be realized by, for example, more suppressing the traveling power with respect to the accelerator pedal operation amount than when the ECO mode is not selected (normal case).

The electric power consumption by the heating apparatus 26 increases during the GI heating operation. However, in modification example 4, the GI heating operation is forced to be performed in the case of the ECO mode so as to avoid the start of the engine 2 (hot water heating) which results from an insufficient heating capacity due to the limitation of the GI heating operation and execute the ECO mode.

When the ECO mode is not selected in the CD mode, the normal heating operation (+hot water heating) is performed. This is to suppress the electric power consumption and ensure the traveling distance in the CD mode by performing the normal heating operation (+hot water heating) when the ECO mode is not selected.

FIG. 12 is a flowchart illustrating a processing procedure of heating control that is executed by the ECU 30 according to modification example 4. Referring to FIG. 12, this flowchart further includes Step S92 in addition to the flowchart illustrated in FIG. 8.

In other words, the ECU 30 determines whether or not the ECO mode is selected (Step S92) in the ECO mode switch 32 (FIG. 1) when it is determined that the CD mode is selected in Step S50 (Step S50: YES). When it is determined that the ECO mode is selected (Step S92: YES), the ECU 30 allows the process to proceed to Step S60 and the GI heating operation is performed. When the ECO mode is not selected (Step S92: NO), the ECU 30 allows the process to proceed to Step S70 and the normal heating operation is performed.

As described above, the GI heating operation is performed, without the heating operation by the heat pump cycle limited, when the ECO mode is selected in the CD mode according to modification example 4. As such, the ECO mode can be executed with the start of the engine 2 resulting from an insufficient heating capacity avoided although the electric power consumption increases due to the heating operation. When the ECO mode is not selected in the CD mode, the GI heating operation is limited so that the electric power consumption can be suppressed and the traveling distance in the CD mode can be ensured.

Modification example 4 may also be combined with modification examples 1 to 3 described above. For example, referring back to FIG. 9, the ECU 30 may allow the process to proceed to Step S60 and the GI heating operation may be performed in a case where it is determined that the CD mode is selected in Step S50 (Step S50: YES) and the ECO mode is selected. When the ECO mode is not selected, the ECU 30 may allow the process to proceed to Step S70 and the normal heating operation may be performed.

Likewise, the ECU 30 may allow the process to proceed to Step S76 and the normal heating operation may be performed in a case where it is determined that the CD mode is selected in Step S74 (Step S74: YES) and the ECO mode is selected. When the ECO mode is not selected, the ECU 30 may allow the process to proceed to Step S78 and the hot water heating may be performed.

In the embodiment and each of the modification examples described above, the hybrid vehicle 1 is a hybrid vehicle that can be externally charged. However, the present invention can also be applied to hybrid vehicles without an external charging function. The CD mode/CS mode are suitable for a hybrid vehicle that can be externally charged, but are not necessarily limited to the hybrid vehicle that can be externally charged.

In the above description, the engine 2 corresponds to an embodiment of an "internal combustion engine" according to the present invention, and the motor generator 6 corresponds to an embodiment of the "generator" according to the present invention. In addition, the motor generator 10 corresponds to an embodiment of the "electric motor" according to the present invention, and the ECU 30 corresponds to an embodiment of the "electronic control device" according to the present invention. Moreover, the heat pump cycle corresponds to an embodiment of an "electric heater" according to the present invention, and the heater core 105 corresponds to an embodiment of the "hot water heater" according to the present invention.

It should be noted that the embodiment disclosed herein is illustrative and is not restrictive in any aspect. The scope of the present invention is clarified by the scope of the claims, not by the description of the embodiment above, and any modification within the same significance and scope as the scope of the claims is included in the present invention.

The invention claimed is:

1. A hybrid vehicle comprising:
an internal combustion engine that generates a driving force for the hybrid vehicle;
a generator that generates electric power by using an output of the internal combustion engine;
a battery that stores the electric power generated by the generator;
an electric motor that generates the driving force for the hybrid vehicle by receiving at least one of the electric power that is generated by the generator and the electric power that is stored in the battery;
a heating apparatus that heats a vehicle cabin, the heating apparatus including an electric heater that heats the vehicle cabin by using the electric power that is stored in the battery; and
an electronic control unit configured to:
(a) control traveling of the vehicle by selectively applying a charge depleting mode and a charge sustaining mode, the charge depleting mode being a mode in which a state of charge of the battery is consumed and the charge sustaining mode being a mode in which the state of charge is maintained;
(b) control traveling of the vehicle by selecting a EV travel or a HV travel based on a traveling power of the hybrid vehicle in both the charge depleting mode and the charge sustaining mode, the EV travel being a travel by using the electric motor with the internal combustion engine stopped, the HV travel being a travel by using the driving force of the internal combustion engine in addition to the driving force of the electric motor or instead of the driving force of the electric motor; and
(c) in both cases that the vehicle is in the HV travel and the EV travel, control the electric heater so that the heating by the electric heater is more limited in the charge sustaining mode than in the charge depleting mode, wherein
the electric heater is configured to perform, in both the charge depleting mode and the charge sustaining mode, a heating operation in a first heating operation mode and a second heating operation mode in which electric power consumption is greater and heating capacity is higher than in the first heating operation mode, and
the electronic control unit is configured to, in a case that a heating request is present and a required heating capacity cannot be ensured with the first heating operation mode, perform the heating operation of the electric heater in the second heating operation mode more limitedly in the charge sustaining mode than in the charge depleting mode and start the internal combustion engine.

2. The hybrid vehicle according to claim 1, wherein the electric heater is configured with a heat pump cycle, the heat pump cycle includes an electric compressor, an indoor condenser, an expansion valve, and an outdoor heat exchanger, and
the second heating operation mode is a gas injection mode in which a gas refrigerant downstream of the expansion valve returns to an intermediate port of the electric compressor without passing through the outdoor heat exchanger.

3. The hybrid vehicle according to claim 1, wherein the heating apparatus further includes a hot water heater, the hot water heater heats the vehicle cabin by using a coolant of the internal combustion engine with the internal combustion engine used as a heat source, and
the electronic control unit is configured to limit the heating by the electric heater by more preferentially using the heating by the hot water heater in the charge sustaining mode than in the charge depleting mode.

4. The hybrid vehicle according to claim 3, wherein
the electronic control unit is configured to control the electric heater, without limiting the heating by the electric heater, when a temperature of the internal combustion engine or the coolant is lower than a determination value even in the charge sustaining mode.

5. The hybrid vehicle according to claim 1, wherein
the electronic control unit is capable of controlling the traveling of the vehicle by applying an ECO mode in which a frequency of a start of the internal combustion engine is suppressed,
the electronic control unit is configured to control the electric heater, without limiting the heating by the electric heater, when the charge depleting mode is selected and the ECO mode is selected, and
the electronic control unit is configured to control the electric heater so that the heating by the electric heater is limited when the charge depleting mode is selected and the ECO mode is not selected.

6. A method for controlling a hybrid vehicle including an internal combustion engine that generates a driving force for the hybrid vehicle; a generator that generates electric power by using an output of the internal combustion engine; a battery that stores the electric power generated by the generator; an electric motor that generates a driving force for the hybrid vehicle by receiving at least one of the electric power that is generated by the generator and the electric power that is stored in the battery; a heating apparatus that heats a vehicle cabin, the heating apparatus including an electric heater that heats the vehicle cabin by using the electric power that is stored in the battery; and an electronic control unit, the method comprising:

(a) controlling traveling of the vehicle by the electronic control unit by selectively applying a charge depleting mode and a charge sustaining mode, the charge depleting mode being a mode in which a state of charge of the battery is consumed and the charge sustaining mode being a mode in which the state of charge is maintained;

(b) controlling traveling of the vehicle by the electronic control unit by selecting a EV travel or a HV travel based on a traveling power of the hybrid vehicle in both the charge depleting mode and the charge sustaining mode, the EV travel being a travel by using the electric motor with the internal combustion engine stopped, the HV travel being a travel by using the driving force of the internal combustion engine in addition to the driving force of the electric motor or instead of the driving force of the electric motor; and (c) in both cases that the vehicle is in the HV travel and the EV travel, controlling the electric heater by the electronic control unit so that the heating by the electric heater is more limited in the charge sustaining mode than in the charge depleting mode, wherein the electric heater performs, in both the charge depleting mode and the charge sustaining mode, a heating operation in a first heating operation mode and a second heating operation mode in which electric power consumption is greater and heating capacity is higher than in the first heating operation mode, and the electronic control unit, in a case that a heating request is present and a required heating capacity cannot be ensured with the first heating operation mode, performs the heating operation of the electric heater in the second heating operation mode more limitedly in the charge sustaining mode than in the charge depleting mode and starts the internal combustion engine.

* * * * *